United States Patent [19]

Schimmel et al.

[11] Patent Number: 5,183,651
[45] Date of Patent: Feb. 2, 1993

[54] PROCESS FOR THE PREPARATION OF CRYSTALLINE SODIUM SILICATES

[75] Inventors: Günther Schimmel; Michael Kotzian; Reinhard Gradl, all of Erftstadt, Fed. Rep. of Germany

[73] Assignee: Hoechst Aktiengesellschaft, Frankfurt am Main, Fed. Rep. of Germany

[21] Appl. No.: 635,933

[22] Filed: Dec. 28, 1990

[30] Foreign Application Priority Data

Jan. 12, 1990 [DE] Fed. Rep. of Germany ....... 4000705

[51] Int. Cl.$^5$ ............................................. C01B 33/32
[52] U.S. Cl. ..................................... 423/334; 423/332
[58] Field of Search ................................ 423/334, 332

[56] References Cited

U.S. PATENT DOCUMENTS

| 1,119,720 | 12/1914 | Paterson | 423/334 |
| 3,203,755 | 8/1965 | Rathmell | 423/334 |
| 4,585,642 | 4/1986 | Rieck | 423/333 |

FOREIGN PATENT DOCUMENTS 0056094 10/1981 European Pat. Off. .
0293640 5/1988 European Pat. Off. .
3718350 12/1988 Fed. Rep. of Germany .

OTHER PUBLICATIONS

Glastechnische Berichte, 37. Jahrgang, Heft 4, (1964) pp. 194–200.

*Primary Examiner*—Olik Chaudhuri
*Assistant Examiner*—Ken Horton
*Attorney, Agent, or Firm*—Connolly & Hutz

[57] ABSTRACT

To prepare crystalline sodium silicates having a layer structure and the formula $Na_2Si_xO_{2x+1}$, in which x is between 2 and 3, sand and soda are first fused in a molar ratio of $SiO_2/Na_2O$ of 2 to 3.5 at temperature of 1200° to 1400° C. The water-glass obtained in pieces after the melt has cooled is ground to particle sizes of less than 2 mm before it is treated at temperatures of 600° to 800° C. for 10 to 120 minutes in an elongated reaction zone with mechanical circulation. Finally, the material leaving the reaction zone is ground to a particle fineness of less than 1 mm.

3 Claims, No Drawings

PROCESS FOR THE PREPARATION OF CRYSTALLINE SODIUM SILICATES

The present relates to a process for the preparation of crystalline sodium silicates having a layer structure and the formula $Na_2Si_xO_{2x+1}$, in which x is between 2 and 3.

It is known from German Offenlegungsschrift 3,718,350 that crystalline anhydrous sodium silicates having a layer structure and a molar ratio of $SiO_2$ to $Na_2O$ of (1.9 to 3.5):1 can be obtained by treating water-glass solutions having a solids content of 20 to 65% by weight in a spray drying zone to form a hydrated amorphous sodium silicate, the waste gas flowing out of the spray drying zone having a temperature of at least 140° C. The hydrated amorphous sodium silicate is annealed in an annealing zone at 500° to 800° C. for 1 to 60 minutes in the presence of at least 10% by weight of a recycled material which has been obtained by mechanical comminution of crystalline sodium silicate previously discharged from the annealing zone.

The disadvantage of the known process is that it is energy- and investment-intensive. In this process, hydrothermally prepared water-glass solutions are thus freed from water again in two steps, a spray drying device being required for the first step, that is to say conversion of the water-glass solutions into solids.

The object of the present invention is thus to provide a process for the preparation of crystalline sodium silicates having a layer structure which can be carried out with a low expenditure on energy and with simple apparatuses.

This is achieved according to the invention by fusing sand and soda in a molar ratio of $SiO_2/Na_2O$ of 2 to 3.5 at temperatures of 1200° to 1400° C.; grinding the water-glass obtained in pieces after the melt has cooled to particle sizes of less than 2 mm; treating the ground water-glass at temperatures of 600° to 800° C. for 10 to 120 minutes in an elongated reaction zone with mechanical circulation; and grinding the material leaving the reaction zone to a particle fineness of less than 1 mm.

The process according to the invention can furthermore optionally also be carried out by
a) adding 2 to 30% by weight, based on the amount of material leaving the reaction zone, of reaction product having a particle fineness of less than 1 mm to the ground water-glass,
b) treating the ground water-glass in the reaction zone for 45 to 90 minutes and
c) treating the ground water-glass in the reaction zone at temperatures of 700° to 760° C.

The water-glass obtained according to the invention by fusion of sand and soda in a molar ratio of $SiO_2/Na_2O$ of 2 to 3.5 is present in pieces having an edge length of about 5 cm after the melt has cooled. This water-glass is radiologically amorphous and dissolves only very slowly in water under normal conditions.

According to the invention, the radiologically amorphous water-glass is converted quantitatively into crystalline sodium silicate by being heat-treated in the finely ground state under mechanical agitation, the outer, already crystallized shell of each grain, being knocked off so that the required heat can penetrate into each grain at a sufficient speed while the crystallization continues.

The addition according to the invention of finely ground reaction product (recycled material) to the ground water-glass in the reaction zone causes an increase in the rate of crystallization and prevents caking of the ground water-glass during the heat treatment.

The water-glass in the form of pieces is advantageously ground with a robust, slow-running impact mill, for example a hammer mill having a screen insert. Fine grinding of the reaction product can be carried out with the aid of a vibratory mill, a bead mill or an air-jet mill.

EXAMPLE 1

121 kg of sand (99% of $SiO_2$) and 106 kg of soda (molar ratio of $SiO_2/Na_2O=2$) were fused in a tank furnace and the water-glass melt was poured into flat metal molds at 1300° C. The cooled melt broke up into pieces having an edge length of about 5 cm. The pieces were ground to particle sizes of less than 2 mm in a hammer mill running at 2100 revolutions per minute and were treated at about 750° C. in a rotating rotary tube furnace, slight sticky deposits being formed on the furnace wall. Finally, the material issuing from the rotary tube furnace was ground to a particle fineness of less than 1 mm.

It was ascertained by X-ray methods that the material was composed predominantly of $\alpha$-$Na_2Si_2O_5$ and contained little $\delta$-$Na_2Si_2O_5$.

EXAMPLE 2

Example 1 was repeated with the amendment that 20 kg of recycled material (11% by weight) having a particle fineness of less than 1 mm were added to the ground water-glass on entry into the rotary tube furnace. This resulted in no caking at all on the internal walls of the rotary tube furnace.

The resulting material was likewise composed predominantly of $\alpha$-$Na_2Si_2O_5$ and contained little $\delta$-$Na_2Si_2O_5$; however, it had a higher crystallinity than the material obtained according to Example 1.

EXAMPLE 3

Example 1 was repeated with the modifications that 192 kg of sand were fused with 106 kg of soda (molar ratio of $SiO_2/Na_2O=3.2$) and that the treatment in the rotary tube furnace was carried out at 710° C.

It was ascertained by radiography that the material was composed essentially of $Na_2Si_3O_7$ with small amounts of $SiO_2$.

We claim:
1. A process for the preparation of crystalline sodium silicates having a layer structure and the formula $Na_2Si_xO_{2x+1}$ in which x is between 2 and 3 consisting of the steps:
   a) fusing sand and soda in a molar ratio of $SiO_2/Na_2O$ of 2 to 3.5 at temperatures of 1200° to 1400° C. with the resultant formation, after cooling the melt, of a lumpy water glass;
   b) grinding the lumpy water glass to a particle size of less than 2 mm;
   c) treating the ground water glass at temperatures of 600° to 800° C. for 10 to 120 minutes in an elongated reaction zone with mechanical circulation; and
   d) grinding the material leaving the reaction zone to a particle fineness of less than 1 mm.
2. The process as claimed in claim 1, wherein the ground water-glass is treated in the reaction zone for 45 to 90 minutes.
3. The process as claimed in claim 1, wherein the round water-glass is treated in the reaction zone at temperatures of 700° to 760° C.

* * * * *